United States Patent

[11] 3,619,399

[72] Inventors Werner Josef Blank;
　　　　　　　Gerhard Josef Pietsch, both of Stamford, Conn.
[21] Appl. No. 872,353
[22] Filed Oct. 29, 1969
[45] Patented Nov. 9, 1971
[73] Assignee American Cyanamid Company
　　　　　　　Stamford, Conn.

[54] ACRYLIC PRIMER
　　　10 Claims, No Drawings
[52] U.S. Cl. .................................................. 204/181,
　　　　　　　　　　　　　　　　　　　　　　　156/151
[51] Int. Cl. ................................................. B01k 5/02,
　　　　　　　　　　　　　　　　　　　　　　　C23b 13/00

[50] Field of Search ........................................... 204/181

[56] References Cited
UNITED STATES PATENTS
3,471,388　10/1969　Korol ......................... 204/181
3,540,990　11/1970　Onishi et al. ................ 204/181

Primary Examiner—Howard S. Williams
Attorney—Frank M. Van Riet

ABSTRACT: A method for priming electrodeposited acrylic resin coatings to increase their adhesion to epoxy coatings which comprises treating said acrylic coatings with a polyamine and the resultant coated articles, are disclosed.

ACRYLIC PRIMER

BACKGROUND OF THE INVENTION

The coating of various metallic articles of manufacture utilizing electrophoretic techniques has become more widely practiced in recent years. These techniques enable large articles to be more completely and uniformly coated than hand or automatic spraying, brushing or dipping etc.

One of the deficiencies of coating by electrodeposition resides in the fact that acrylic resins coated by such a method are not susceptible to normal adhesives. That is to say, electrodeposited acrylic resin coatings, when contacted with an adhesive material, such as an epoxy adhesive, for purposes of ultimately applying metal thereto, do not adequately adhere to the metal and therefore are not useful for many commercial applications.

SUMMARY

We have now found that the adhesion between an electrodeposited acrylic resin coating and an adhesive, such as an epoxy adhesive, can be materially increased by first priming the acrylic coating with a polyamine.

Reference is made to the article "Electrodeposition: Theory and Practice," by Glover et al., Official Digest, Feb. 1965, pages Nos. 113–128, inclusive. Attention is also directed to British Pats. Nos. 933,175 175 and 1,102,384, published Aug. 8, 1963 and Feb. 7, 1968, respectively and U.S. Pat. No. 3,471,338. Each of said references is hereby incorporated herein by reference.

DESCRIPTION OF THE INVENTION INCLUDING PREFERRED EMBODIMENTS

As mentioned above, our novel method comprises treating an electrodeposited acrylic resin coating with a polyamine in order to render the coating more susceptible to adhesives.

The acrylic resin used in the novel process of the present invention is a water-dispersible, nongelled, polymeric material carrying an anionic charge.

It should be observed that it is not sufficient for the ionic, water-dispersible, nongelled, acrylic resin to only possess the above characteristics, but the nongelled, acrylic resin must, in addition thereto, also contain sufficient carboxyl groups so as to create an acid number of at least about 20 in the resultant resin. In addition to the carboxyl groups, the acrylic resin may contain such groups as alcoholic hydroxyl groups and amido groups which may also cross-link with the guanamine or melamine cross-linking agent which must also be used.

The purpose for having the electric charge on the water-dispersible, nongelled, acrylic resin is so that it will migrate to the anode in an electrophoretic system. As will be apparent from the illustrative example set forth hereinbelow, the guanamine or melamine cross-linking agent moves to the electrode during deposition along with the charged polymeric acrylic material and both materials thereby become deposited thereon, the electrode, in most instances, being the metallic article which is to be coated.

After the deposition of the mixed polymeric material has been accomplished on the metal, the coated metal is then heat treated, preferably by baking, in order to accomplish the cross-linking between the guanamine or melamine and the acrylic resin containing the cross-linking sites that are heat reactive with the guanamine or melamine. As used in an electrodeposition process, the bath has a pH of between about 6 and 11 and, preferably, between about 7 and 9.

The anionic, water-dispersible, nongelled, polymeric material used in the composition of the present invention may be any one of a plurality of acrylic resins which have reactive sites that are heat reactive with the substantially fully etherified tetramethylol guanamine or substantially fully etherified hexamethylol melamine and possess the other properties mentioned above. These reactive sites may be the carboxyl groups. Any available alcoholic hydroxyl groups and/or amido groups may also form a cross-linking site, the acrylic resin being the result of vinyl polymerization. The acrylic resins may be completely water-soluble or they may be substantially water-insoluble but capable of being dispersed in water. Sometimes it may be necessary to use appropriate surfactants to disperse the acrylic resins. The term "water-dispersible," therefore, is intended to encompass both the aqueous solutions as well as dispersions in which the acrylic resin may be suspended in the aqueous medium. The acrylic resin is generally used in combination with the melamine or guanamine in the form of an emulsion which can be prepared by incorporating an amine such as diethylamine into the electrodeposition media, as is known in the art.

When the anionic acrylic resins are prepared and dispersed in water, they may be rendered alkaline by adjusting the pH to a point about 4 to about 11 and, preferably, to a pH above about 7 to about 9. This adjustment of the pH is accomplished on the anionic acrylic resin before the substantially fully etherified tetramethylol guanamine or substantially fully etherified hexamethylol melamine are added and then, if necessary, the pH is readjusted to a point within the ranges set forth hereinabove.

The anionic, acrylic resins are prepared by vinyl polymerization and may be prepared in either an aqueous solution, organic solvent and the like. All of these procedures are thoroughly well known in the art and it is not deemed necessary to elaborate thereon.

The acrylic resins may be prepared by polymerizing polymerizable monomers such as acrylic acid, methacrylic acid, crotonic acid, β-benzoyl acrylic acid, fumaric acid, maleic acid, etc. in the presence of other monomers which contain no carboxyl groups such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate, and the like. Still further, one can copolymerize the carboxy group containing monomer with such copolymerizable monomers as styrene, ortho-, meta- or para-alkyl styrenes such as the o-, m- or p-methyl, ethyl, propyl and butyl styrenes, 2,4-dimethyl styrene, 2,3-dimethyl styrene, 2,5-dimethyl styrene, vinyl naphthenate, acrylonitrile, methacrylonitrile, halo ring or side chain styrenes such as α-chloro styrene, ortho-, meta- or para-chloro styrenes, 2,4-dichloro styrene, 2,3-dichloro styrene, 2,5-dichloro styrene or the alkyl side chain styrenes such as α-methyl styrene, α-ethyl styrene, and the like. Additionally, one can make use of such polymerizable vinyl monomers as acrylamide, methacrylamide, ethacrylamide, N-tertiary-butylacrylamide, and the like.

Alcoholic hydroxyl groups may be incorporated into the acrylic resin by using a polymerizable vinyl monomer which contains an alcoholic hydroxyl group such as the hydroxy alkyl esters of α, β-unsaturated monocarboxylic acids e.g. the hydroxy alkyl esters of acrylic acid, methacrylic, ethacrylic and chloro as well as the other chloro substituted acrylic acids. These esters may either have a primary or a secondary hydroxyl group. Illustrative of the types of compounds that are used to make the copolymers in the anionic, polymeric material are 2-hydroxy-ethyl acrylate, 2-hydroxy-propyl acrylate, 3-hydroxy-propyl acrylate, 2-hydroxy-butyl acrylate, 3-hydroxy-butyl acrylate, 4-hydroxy-butyl acrylate, 8-hydroxy-octyl acrylate, 2-hydroxy-ethyl methacrylate, 5-hydroxy-hexyl methacrylate, 6-hydroxy-octyl methacrylate, 8-hydroxy-octyl methacrylate, 10-hydroxy-decyl methacrylate, 3-hydroxy-propyl crotonate, 4-hydroxy-amyl crotonate, 5-hydroxy-amyl crotonate, 6-hydroxy-hexyl crotonate, 7-hydroxy-heptyl crotonate, 10-hydroxy-hexyl crotonate, and the like. These hydroxy esters may be used either singly, in combination with one another or with other polymerizable vinyl monomers devoid of any alcoholic hydroxyl group including those set forth hereinabove. Additionally, one can make use of other hydroxyl-containing polymerizable vinyl monomers such as methylacrylamide, methylolmethacrylamide, and the like.

Among the amide group-containing monomers which may be used to incorporate amido groups into the anionic, water-dispersible, acrylic material used in the present invention are acrylamide, methacrylamide, ethacrylamide, and the like. These polymerizable acrylamides may be used to prepare anionic copolymeric materials useful in the present invention with the carboxyl group-containing monomers and/or any of the hydroxyl group-containing monomers or other copolymerizable monomers set forth hereinabove.

In order to illustrate the preparation of an anionic carboxyl group-containing polymer, the following example is set forth in which all parts are parts by weight, unless otherwise indicated.

CARBOXYL GROUP-CONTAINING ACRYLIC RESIN

Into a suitable reaction vessel equipped with stirrer, thermometer and reflux condenser, there are introduced 10 parts of ethylamylketone and 45 parts of ethyl cellosolve. The charge is heated gradually to 90° C. After the mixture has reached 90° C., a mixture of 40 parts of butyl acrylate, 10 parts of acrylic acid, 20 parts of acrylonitrile, 15 parts of 2-hydroxyethyl acrylate, 2 parts of azobisisobutyronitrile and 70 part of n-dodecyl mercaptan is added. After addition is completed, the mixture is kept at 90° C. for 2 hours. The resultant polymer solution (61.5 percent solids) has an acid number of 83.5, based on 100 percent solids.

Similar acrylic resins can be prepared containing hydroxy groups in addition to carboxy groups by the substitution of, or addition of, for example, β-hydroxyethyl methacrylate. Furthermore, the incorporation of acrylamide creates amide groups in the acrylic resin.

It is also within the scope of the present invention to incorporate various additives into the acrylic resins. For example, various dyes or pigments, e.g. $TiO_2$; $Fe_2O_3$ chromates etc., can be added so that the coating which results from the electrodeposition process will be colored, e.g. white, red, etc.

The guanamines useful herein as the cross-linking agent are substantially pure alkylated tetramethylol guanamines or mixtures of various substantially fully etherified tetramethylol guanamines which contain at least eight carbon atoms, exclusive of those three carbon atoms in the triazine ring.

The substantially fully etherified tetramethylol guanamines may have anywhere from 2 alkoxymethyl groups, to 4 alkoxymethyl groups or any combination of 2–4 of the same or different alkoxymethyl groups, wherein said alkoxy radicals can possess from one to four carbon atoms, inclusive.

The guanamine compounds useful in our process are represented by the formula

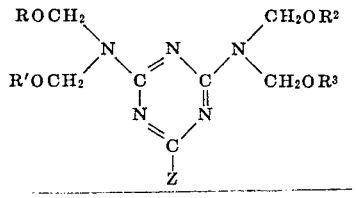

wherein R, R', $R^2$ and $R^3$ are the same or different alkyl radicals of one to four carbon atoms, inclusive, or hydrogen, at least 2 being an alkyl radical, and Z is hydrogen, an alkyl radical of one to eight carbon atoms, inclusive, or an aryl radical.

The substantially fully etherified methylol guanamines are not considered to be resinous materials since they are, as individual entities, nonpolymeric compounds. They are, however, potential resin-forming compounds which can enter into chemical reaction or association with the anionic, water-dispersible, nongelled acrylic resin when subjected to heat and particularly when subjected to heat under acidic conditions. The concept of the degree of alkylation on the average, will be discussed herein in order that this concept may be more fully understood.

Theoretically, it is possible to methylolate guanamine fully, that is, to produce tetramethylol guanamine. However, frequently a composition purporting to be tetramethylol guanamine, when analyzed shows a fractional degree of methylolation. It is well recognized that fractional methylolation is not considered to be possible. As a consequence, when a composition containing on analysis, a degree of methylolation of below 4.0, it has to be recognized that this is but an average degree of the methylolation of the guanamine compound and establishes logically that the aforementioned methylol composition is composed of a mixture of a preponderant amount of tetramethylol guanamine with comparatively minor amounts of trimethylol guanamine and perhaps insignificant amounts of such derivatives as dimethylol guanamine and even monomethylol guanamine. The same concept of averages is also applicable to the alkylation or etherification of the tetramethylol guanamine composition. There cannot be, based on present reasoning, a fraction alkylation and, as a consequence, when on analysis, a given composition shows that the degree of, for example, methylation is 3.7, it must be concluded that there is present in such a composition some combination of monomethyl, dimethyl, trimethyl and tetramethyl ethers. If a mixture of, e.g., methanol and ethanol is used in the alkylation, there may be present some monoethyl ether dimethyl ether of tetramethylol guanamine, some dimethyl ether monoethyl ether of tetramethylol guanamine etc. Therefore, irregardless of whether the reaction is with a sole alcohol or a mixture of alcohols, the resultant product is generally a mixture of substantially fully etherified tetramethylol guanamines which have 1–4 alkoxymethyl groups, on the average, and which may contain any one of the following compounds and in varying amounts depending on the degree of methylation and the degree of different alkylation. Included in that group of compounds are the following: tetramethyl ethers of tetramethylol guanamines, dimethyl diethyl ethers of tetramethylol guanamines, trimethyl monoethyl ethers of tetramethylol guanamines, monomethyl triethyl ethers of tetramethylol guanamines, and the like, including corresponding aceto, formo or propioguanamines and the like.

While the above discussion has been directed primarily to monomeric guanamines, it should be understood that such materials as dimers, trimers etc. of the above guanamine compounds may also be utilized, alone or in admixture with the specified guanamines.

As discussed above in regard to the guanamines useful herein, a substantially fully etherified hexamethylol melamine material may also be used in substantially pure form or as admixtures of various etherified hexamethylol melamines with one another.

When a mixture of substantially fully etherified hexamethylol melamines is used, the melamine should have at least 4, and preferably at least 5, alkoxymethyl groups on the average. The alkoxymethyl groups may include methoxymethyl, ethoxymethyl, propoxymethyl or butoxymethyl groups or mixtures thereof.

The melamine cross-linking agents also are potential resin-forming compounds which enter into chemical reaction with the anionic, water-dispersible, nongelled, acrylic resin when subjected to heat and particularly when subjected to heat under acidic conditions. The concept of the degree of methylation or, more broadly, alkylation on the average, will also be discussed here as above with the guanamine compounds.

Theoretically as with the guanamines, it is possible to methylolate melamine fully, that is, to produce hexamethylol melamine. However, frequently a composition purporting to be hexamethylol melamine, when analyzed shows a fractional degree of methylolation. It is well recognized that fractional methylolation is not considered to be possible. As a consequence, when a composition containing on analysis a degree of methylolation is not considered to be possible. As a consequence, when a composition containing on analysis a degree of methylolation of 5.75, 5.80 or even 5.90, it has to be recognized that this is but an average degree of the methylolation of the melamine compound and establishes logically that the aforementioned methylol composition is composed of a mixture of a preponderant amount of hexamethylol melamine with comparatively minor amounts of pentamethylol melamine and perhaps insignificant amounts including traces of such derivatives as tetramethylol melamine and even trimethylol melamine etc. The same concept of averages is also applicable to the alkylation or etherification of the hexamethylol melamine composition. There cannot be, based on present reasoning, a fractional alkylation and, as a consequence, when on analysis, after reaction with a mixture of methanol and ethanol, a given composition shows that the degree of methylation is 2.5 and the degree of ethylation is correspondingly about 3.5 it must be concluded that there is present, in such a composition, some dimethyl ether tetraethyl ether of hexamethylol melamine as well as some trimethyl ether triethyl ether of hexamethylol melamine. There may also be present some monoethyl ether pentamethyl ether of hexamethylol melamine, or even some tetramethyl ether diethyl ether of hexamethylol melamine etc. Therefore, when the reaction is conducted with only methanol, the mixture of substantially fully etherified hexamethylol melamines may contain any one of the following compounds in varying amounts depending on the degree of methylation and the degree of different alkylation. Included in that group of compounds are the following: the hexamethyl ether of hexamethylol melamine, pentamethyl ethers of hexamethylol melamine, tetramethyl ethers of hexamethylol melamine, trimethyl ethers of hexamethylol melamine, dimethyl ethers of hexamethylol melamine and monomethyl ethers of hexamethylol melamine. When propanols, including normal propanol as well as isopropanol, are used, with, for example, methanol as the alkylating mixture, the following ethers may be present in the system or mixture: hexamethyl ethers of hexamethylol melamine, pentamethyl monopropyl ethers of hexamethylol melamine, tetramethyl dipropyl ethers of hexamethylol melamine, trimethyl tripropyl ethers of hexamethylol melamine, dimethyl tetrapropyl ethers of hexamethylol melamine, monomethyl pentapropyl ethers of hexamethylol melamine, and hexapropyl ethers of hexamethylol melamine. When the butanols are used, including normal butanol, secondary butanol, isobutanol and tertiary butanol, as the alkylating material, again with methanol, the blend of etherified hexamethylol melamines may include some or all of the following derivatives depending on the degree of methylation and the degree of butylation: hexamethyl ethers of hexamethylol melamine, pentamethyl monobutyl ethers of hexamethylol melamine, tetramethyl, dibutyl ethers of hexamethylol melamine, trimethyl tributyl ethers of hexamethylol melamine, dimethyl tetrabutyl ethers of hexamethylol melamine, monomethyl, pentabutyl ethers of hexamethylol melamine and the hexabutyl ethers of hexamethylol melamine. In addition to dihetero alkylation of the hexamethylol melamine, one could prepare and utilize trihetero alkylated hexamethylol melamines and tetrahetero alkylated hexamethylol melamines, if desired, but the process for preparing such a trihetero alkylated or a tetrahetero alkylated material would present processing complications, and it has not been found that any advantage is to be gained by using such trihetero alkylated and tetrahetero alkylated materials. As a consequence, the commercialization of these etherified hexamethylol melamines is expected to be limited to the mono alkylated or dihetero alkylated hexamethylol melamines.

The acrylic coatings are generally prepared by blending the anionic, water-dispersible, nongelled, acrylic resin with the melamine or guanamine, which acrylic resin is heat reactive with said melamine and guanamine cross-linking agents. The two components are blended in an aqueous solvent. The dispersion medium may consist of water alone or may contain additional solvents, but generally, water should be the preponderant member of the dispersion medium and, for economic reasons, other possible solvents that could be used with water are omitted unless they are designed to serve some special function.

The amount of the substantially fully etherified tetramethylol guanamine or substantially fully etherified hexamethylol melamine used in the present invention will be that amount sufficient to react with at least 5 percent of the reactive groups present in the acrylic resin and generally will vary between about 5 percent and about 40 percent, by weight, based on the total weight of cross-linking agent and the anionic, water-dispersible, nongelled, acrylic resin which is heat reactive with said guanamine or melamine. Correspondingly, there will generally be from about 95 percent to about 60 percent, by weight, of the anionic, water-dispersible, nongelled, acrylic resin which is heat reactive with either or both of said cross-linking agents, based on the total weight of said acrylic material and cross-linking agent. It should be apparent that all of the above percentages, by weight, will total 100 percent, by weight, and are based on the total solids weight of the guanamine or melamine and said acrylic resin. It is preferred to use between about 10 percent and about 30 percent, by weight, of the guanamine or melamine and correspondingly from about 90 percent and 70 percent, by weight, of the said acrylic resin, same basis. In no case should more guanamine or melamine be tolerated than will react with more than about 80 percent of the available carboxyl or hydroxyl groups of the acrylic resin.

In order to render the above-described acrylic resin cross-linking agent electrodeposited coatings susceptible to contact with adhesives, it is necessary according to our invention, to prime the deposited coating with a polyamine.

In general, any polyamine may be utilized, the only criterion being that the polyamine have a boiling point above the temperature at which the acrylic coating is cured.

Illustrative polyamines include reaction products of dimerized fatty acids, such as oleic acid, and polyamines such as ethylenediamine, diethylenetriamine etc., such as taught in U.S. Pat. No. 2,379,413, hereby incorporated herein by reference. Aromatic polyamines such as p-phenylenediamine, m-phenylenediamine, 2,4'; 3,3'; 4,4' etc. diaminodiphenyls, o-tolidine, p-tolidine, 3,5-diaminophenol, the naphthalenediamines, i.e. 1,7; 1,8; 1,6 etc., triaminobenzene, 4,4'-diaminodiphenylamine, 4,4'-diaminodiphenylethane and the like may also be used. We may also use the alycyclic amines such as methanediamine, isophoronediamine, diaminocyclohexane, 4-aminomethylpiperidine, cyclohexanebis(methyldiamine) etc. Additional useful polyamines are the polyalkyleneamines such as hexamethylenediamine, tetramethylenediamine, triethylenetetramine and the like. Heterocyclic materials such as pyrazine, pyrazole, pyrazoline, pyrazolone, pyridazine etc. may also find use in our novel process.

After the acrylic coating has been electrodeposited, the excess material is preferably washed off the electrode. The polyamine is then contacted with the coating by dipping, spraying, brushing etc. the polyamine onto the coating. It is preferred that the polyamine be contacted with the coating before the coating is dried and/or cured, in order to obtain the most favorable intermingling of the polyamine and the coating at the point of contact. Contact between the polyamine and the acrylic coating should last preferably at least about 15 seconds, however, a quick dip of 1 or 2 seconds is tolerable.

After the polyamine contact, the resultant product is heat cured under known conditions of temperature etc. to form a well bonded, hard coating of the acrylic resin and melamine or guanamine cross-linking agent, the only critical feature being that the curing temperature must be below the boiling temperature of the polyamine, as mentioned above.

The resultant cured coating is then ready for contact with an adhesive, such as an epoxy adhesive, for purposes of bonding metals thereto. Any resin adhesive known in the art can be utilized for this purpose with such materials as nitrile modified epoxy adhesives, polyurethane based adhesives and other commercially available or otherwise well-known adhesive systems, those useful being of such multitudes so as to render specific enumeration thereof herein virtually impossible. It should suffice to say that all adhesive may be used, the specific material forming no part of the present invention.

The following examples are set forth for purposes of illustration only and are not to be construed as limitations on the present invention except as set forth in the appended claims. All parts and percentages are by weight unless otherwise specified.

EXAMPLE 1

To a suitable electrodeposition tank are added 125 parts of the carboxyl group-containing acrylic resin solution produced as specified hereinabove, 30 parts of a mixed methyl and ethyl ether of hexamethylol melamine, 3 parts of diethylamine and 842 parts of water. A 0.02-inch-thick panel of aluminum is used as the electrode to be coated with acrylic resin. The aluminum panel is connected with the anode of a Ransburg Power Supply 500 AB, 0–500 volts, 0–10 amperes. A steel panel serves as the cathode. The aluminum and steel panels are immersed in the emulsion of acrylic resin and melamine while continuous agitation is initiated. A voltage of 100 volts is then applied for 1 minute. The aluminum panel is removed and the electrodeposited coating is rinsed with water. The panel is then immediately immersed in a polyamine solution for 1 minute. The coating is then cured at about 175° C. for 1 hour. A second panel is then prepared in the same manner and the two panels are then bonded with a commercially available nitrile modified epoxy adhesive, coated surfaces together. The penal strength of the resultant laminate is then determined as set forth in ASTM-D-1876-69.

The results of the laminate prepared in example 1 are set forth in table I, below, along with results recorded utilizing different acrylic resins, polyamines and cross-linking agents.

We claim:

1. An article comprising a self-supporting metal substrate having thereon (A) a heat-curable, electrodeposited coating of a mixture of a substantially fully etherified hexamethylol melamine or a substantially fully etherified tetramethylol guanamine and a water-insoluble acrylic resin having an acid number of at least about 20 and (B) superimposed on said (A), a layer of a polyamine.

2. An article according to claim 1 wherein said (A) is heat-cured.

3. An article according to claim 1 wherein (A) is a mixture of a substantially fully etherified hexamethylol melamine and a water-insoluble acrylic resin.

4. An article according to claim 1 wherein said polyamine is a dimerized fatty acid-polyamine reaction product.

5. An article according to claim 1 wherein said polyamine is p-phenylenediamine.

6. A method for the production of an article according to claim 1 which comprises (A) electrodepositing onto a metal substrate, from an emulsion thereof, a mixture of (I) a water-dispersible, nongelled, acrylic, film-forming resin carrying an anionic charge and having an acid number of at least about 20, and (II) sufficient substantially fully etherified hexamethylol melamine or substantially fully etherified tetramethylol guanamine to react with at least about 5 percent of the groups in said (I) reactive with (II), (B) recovering the resultant coated substrate and removing excess emulsion therefrom and (C) contacting the resultant coating with a polyamine.

7. A method according to claim 2 which comprises (D) heat curing the coating resulting from said (C) at a temperature below the boiling point of said polyamine.

8. A method according to claim 6 wherein (II) is a substantially fully etherified hexamethylol melamine.

9. A method according to claim 6 wherein said polyamine is a dimerized fatty acid-polyamine reaction product.

10. A method according to claim 6 wherein said polyamine is p-phenylenediamine.

* * * * *

TABLE I

| Example | Acrylic resin | Cross-linking agent | Polyamine | Peel strength (p.p.i.) |
|---|---|---|---|---|
| 1 | Same as Example 1 | Same as Example 1 | None | 23–26 |
| 1 | do | do | 2.5% aqueous solution of commercially available dimerized fatty acid-polyamine reaction product. | 36–43 |
| 2 | do | do | 3.8% aqueous solution of p-phenylenediamine. | 30–50 |
| 3 | do | do | 5.0% aqueous solution of isophoronediamine. | 30–42 |
| 4 | Same as Example 1 except acrylamide used in place of acrylonitrile. | do | Same as Example 1 | 37–44 |
| 5 | Same as Example 1 except fumaric acid used in place of acrylic acid. | 45 parts of tetrakis (methoxymethyl) benzoguanamine. | 4.0% 2,4-diaminodiphenyl in water-alcohol mixture. | 32–39 |
| 6 | Same as Example 1 except that 50% of butyl acrylate replaced by styrene. | 55 parts of bis(ethoxymethyl) bis(methoxymethyl) benzoguanamine. | 3.8% 4,4'-diaminodiphenylethane in water-alcohol mixture. | 36–44 |
| 7 | Same as Example 1 except acrylonitrile replaced by α-chlorostyrene. | 25 parts of bis(butoxymethyl) bis(methoxymethyl) guanamine. | 4.2% aqueous solution of triethylenetetramine. | 42–47 |
| 8 | Same as Example 1 except that 2-hydroxyethyl acrylate replaced by methylolacrylamide. | Same as Example 1 | 8.0% aqueous solution of pyrazole. | 38–42 |

UNITED STATES PATENT OFFICE
CERTIFICATE OF CORRECTION

Patent No. 3,619,399          Dated November 9, 1971

Inventor(s) Werner Josef Blank and Gerhard Josef Pietsch

It is certified that error appears in the above-identified patent and that said Letters Patent are hereby corrected as shown below:

Column 1, line 26, "Nos." should be deleted.

Column 1, line 27, "Pats. Nos. 933,175 175" should read --Pats. 933,175--.

Column 2, line 75, "methylacrylamide" should read --methylolacrylamide--.

Column 3, line 24, "70" should read --1--.

Column 3, line 44, "three carbon" should read --three (3) carbon--.

Column 4, line 19, "fraction" should read --fractional--.

Column 4, line 72, the sentence "As a consequence, when a composition containing on analysis a degree of methylolation is not considered to be possible." should be deleted.

Column 7, line 4, "adhesive" should read --adhesives--.

Column 7, line 31, "penal" should read --peel--.

Table I, "23-2$^6$" should read --23-26--.

Table I, "36-4$^3$" should read --36-43--.

Signed and sealed this 30th day of May 1972.

(SEAL)
Attest:

EDWARD M. FLETCHER, JR.
Attesting Officer

ROBERT GOTTSCHALK
Commissioner of Patents